(12) United States Patent
Watanabe et al.

(10) Patent No.: US 11,019,278 B2
(45) Date of Patent: May 25, 2021

(54) IMAGE SENSOR CONFIGURED BY AN IMAGING MODULE INSTALLED IN A BODY MODULE AND A LENS MODULE, AND IS CAPABLE OF PERFORMING GOOD SHADING CORRECTION

(71) Applicant: OMRON Corporation, Kyoto (JP)

(72) Inventors: Kosuke Watanabe, Kusatsu (JP); Yasuhito Uetsuji, Kusatsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/188,296

(22) Filed: Nov. 13, 2018

(65) Prior Publication Data

US 2019/0268548 A1 Aug. 29, 2019

(30) Foreign Application Priority Data

Feb. 23, 2018 (JP) .............................. JP2018-031065

(51) Int. Cl.
| | | |
|---|---|---|
| *H04N 5/243* | (2006.01) | |
| *H04N 5/225* | (2006.01) | |
| *H04N 5/235* | (2006.01) | |
| *H04N 5/357* | (2011.01) | |
| *H04N 5/232* | (2006.01) | |

(52) U.S. Cl.
CPC .......... *H04N 5/243* (2013.01); *H04N 5/2251* (2013.01); *H04N 5/2254* (2013.01); *H04N 5/2351* (2013.01); *H04N 5/23209* (2013.01); *H04N 5/3572* (2013.01)

(58) Field of Classification Search
CPC .... H04N 5/243; H04N 5/2251; H04N 5/2254; H04N 5/23209; H04N 5/2351; H04N 5/3572
See application file for complete search history.

(56) References Cited

U.S. PATENT DOCUMENTS

| | | | |
|---|---|---|---|
| 8,456,569 B2* | 6/2013 | Kaga ..................... | G03B 17/14 |
| | | | 348/207.99 |
| 9,674,420 B2* | 6/2017 | Higuma ............... | H04N 5/3572 |
| 10,742,853 B2* | 8/2020 | Watanabe .......... | H04N 5/23229 |

(Continued)

FOREIGN PATENT DOCUMENTS

| | | |
|---|---|---|
| CN | 1366423 | 8/2002 |
| CN | 101015197 | 8/2007 |

(Continued)

OTHER PUBLICATIONS

"Search Report of Europe Counterpart Application", dated Jun. 26, 2019, p. 1-p. 10. Application EP 18206003.8.

(Continued)

*Primary Examiner* — Luong T Nguyen
(74) *Attorney, Agent, or Firm* — JCIPRNET

(57) ABSTRACT

The disclosure provides an image sensor. A body module of the image sensor acquires specification information of each module from the installed imaging module and lens module, generates shading correction information corresponding to the combination of the installed two modules based on the acquired specification information, and performs shading correction of a content corresponding to the generated shading correction information on image data from the imaging module.

7 Claims, 17 Drawing Sheets

(56) References Cited

U.S. PATENT DOCUMENTS

| | | | |
|---|---|---|---|
| 2002/0094131 A1* | 7/2002 | Shirakawa | H04N 5/2176 |
| | | | 382/274 |
| 2005/0041806 A1 | 2/2005 | Pinto et al. | |
| 2006/0244848 A1* | 11/2006 | Hori | H04N 5/217 |
| | | | 348/251 |
| 2007/0132878 A1* | 6/2007 | Tanaka | H04N 5/23209 |
| | | | 348/360 |
| 2009/0051792 A1 | 2/2009 | Arimoto et al. | |
| 2011/0102668 A1 | 5/2011 | Kaga et al. | |
| 2013/0111464 A1 | 5/2013 | Markas et al. | |
| 2014/0071313 A1* | 3/2014 | Hiasa | H04N 5/21 |
| | | | 348/231.99 |
| 2016/0156851 A1* | 6/2016 | Yamada | H04N 1/40093 |
| | | | 348/223.1 |
| 2016/0173792 A1* | 6/2016 | Ajito | H04N 5/3572 |
| | | | 348/239 |
| 2018/0225839 A1* | 8/2018 | Yoshida | H04N 5/23222 |

FOREIGN PATENT DOCUMENTS

| | | | |
|---|---|---|---|
| EP | 1227669 | | 7/2002 |
| JP | 3184187 | * | 7/2001 |
| JP | 2003244526 | | 8/2003 |
| JP | 2007214682 | | 8/2007 |

OTHER PUBLICATIONS

"Office Action of China Counterpart Application", dated Jun. 18, 2020, with English translation thereof, p. 1-p. 22. Chinese application No. 201811353849.1.

* cited by examiner

| x coordinate | 1 | 2 | | 319 | 320 | 321 | | 639 | 640 |
|---|---|---|---|---|---|---|---|---|---|
| Correction gain | x2.01 | x1.90 | | x1.02 | x1.00 | x1.02 | | x1.90 | x2.00 |
| y coordinate | 1 | 2 | | 239 | 240 | 241 | | 479 | 480 |
| Correction gain | x1.71 | x1.69 | | x1.02 | x1.00 | x1.02 | | x1.69 | x1.70 |

| Zoom setting value | x1.0 | x1.1 | x1.2 | ... | x7.8 | x7.9 | x8.0 |
|---|---|---|---|---|---|---|---|
| Exit pupil position | 20.0mm | 20.1mm | 20.2mm | ... | 25.0mm | 25.1mm | 25.2mm |
| Exit pupil diameter | 10.0mm | 9.9mm | 9.8mm | ... | 9.5mm | 9.5mm | 9.4mm |

| Aperture setting value | F2.0 | F2.1 | F2.2 | ... | F15.8 | F15.9 | F16 |
|---|---|---|---|---|---|---|---|
| Exit pupil reduction rate | x0.707 | x0.690 | x0.674 | ... | x0.252 | x0.251 | x0.250 |

| Format information | Pixel size | Number of pixels in the X direction | Number of pixels in the Y direction | Incident angle characteristic information ||||
|---|---|---|---|---|---|---|---|
| | | | | Incident angle 45° | ... | Incident angle 1° | Incident angle 0° |
| CM1 | 3.45 μm | 640 | 480 | 50 | ... | 98 | 100 |
| CM2 | 3.45 μm | 1280 | 1024 | 60 | ... | 99 | 100 |
| : | : | : | : | : | : | : | : |
| CMm | 5.5 μm | 1280 | 1024 | 50 | ... | 98 | 100 |

FIG. 17

| Format | Zoom setting value | x1.0 | x1.1 | x1.2 | ... | x7.9 | x8.0 |
|---|---|---|---|---|---|---|---|
| LM1 | Exit pupil position | 20.0mm | 20.1mm | 20.2mm | ... | 25.1mm | 25.2mm |
| | Exit pupil diameter | 10.0mm | 9.9mm | 9.8mm | ... | 9.5mm | 9.4mm |
| LM2 | Exit pupil position | 15.0mm | 15.1mm | 15.2mm | ... | 18.1mm | 18.2mm |
| | Exit pupil diameter | 9.0mm | 8.9mm | 8.8mm | ... | 8.5mm | 8.4mm |

FIG. 18

| Format | Aperture setting value | F2.0 | F2.1 | F2.2 | ... | F15.8 | F15.9 | F16 |
|---|---|---|---|---|---|---|---|---|
| LM1 | | x0.707 | x0.690 | x0.674 | ... | x0.252 | x0.251 | x0.250 |
| LM2 | | x0.700 | x0.685 | x0.660 | ... | x0.255 | x0.254 | x0.252 |

FIG. 19

IMAGE SENSOR CONFIGURED BY AN IMAGING MODULE INSTALLED IN A BODY MODULE AND A LENS MODULE, AND IS CAPABLE OF PERFORMING GOOD SHADING CORRECTION

CROSS-REFERENCE TO RELATED APPLICATION

This application claims the priority benefit of Japan Patent Application No. 2018-031065, filed on Feb. 23, 2018. The entirety of the above-mentioned patent application is hereby incorporated by reference herein and made a part of this specification.

BACKGROUND

Technical Field

The disclosure relates to a modular image sensor constituted by a combination of multiple modules.

Description of Related Art

In the production line of a factory, a system called image sensor is frequently used for automating the inspection and management of products and saving labor. In the past, the configuration that connects a camera and an image processing device with a cable is common (see Japanese Laid-Open No. 2007-214682), but recently a processing-integrated image sensor has also been launched which integrates the camera and the image processing device so as to perform from imaging to image processing with a single device. Such a processing-integrated image sensor is also called a "smart camera" and may be formed by integrating illuminations and lenses.

The angle of view desired for the smart camera and the resolution of the imaging result (image data) differ depending on the size of the object to be inspected, the environment where the image sensor is installed, etc. Therefore, makers who provide smart cameras have lined up a large number of products with different specifications such as angles of view, for the user to select the one with the optimum specification.

However, as the IoT development of factories is accelerating, the range of application of smart cameras has expanded, and it is becoming difficult to provide product variations that cover the diverse user needs. Further, in order to be distinguished from the competitors in product competition, more mass customization and seasonal products are offered to meet the preference of each customer and the life cycle of the products of digital devices typified by smart phones is shortening, and there is an increasing need for partially changing the illuminations and lenses, etc. so that change of the object to be inspected enters a short cycle to be optimum for the inspection. Therefore, it is conceivable to respectively modularize the optical system and the imaging element of the smart camera for the user to freely combine the optical system and the imaging element. However, since the contents of shading correction to be applied to the imaging result differ depending on the combination of the optical system and the imaging element, a smart camera for performing good shading correction on the imaging result cannot be realized by simply modularizing the smart camera regardless of the combination of the optical system and the imaging element that is being used.

SUMMARY

An image sensor according to an embodiment of the disclosure includes a body module, and a lens module and an imaging module installed in the body module. Then, the body module of the image sensor includes: an acquisition part acquiring imaging element specification information indicating a size of an imaging element in the imaging module from the installed imaging module and acquiring optical system specification information indicating a specification of an optical system in the lens module from the installed lens module; a correction part, to which shading correction information is settable, performing shading correction on image data outputted by the imaging module according to the set shading correction information; and a generation and setting part generating shading correction information corresponding to a combination of the imaging module and the lens module based on the imaging element specification information and the optical system specification information acquired by the acquisition part, and setting the shading correction information to the correction part.

By adopting the above configuration for the image sensor, it is possible to apply shading correction of a content corresponding to the combination of the lens module and the imaging module installed in the body module to the imaging result (image data from the imaging module). Therefore, it is possible to obtain image data with good shading correction with any combination of the lens module and the imaging module installed in the body module.

In addition, an image sensor according to another embodiment of the disclosure includes a body module, and a lens module and an imaging module installed in the body module. Then, the body module of the image sensor includes: an acquisition part acquiring format information indicating a format of the imaging module from the installed imaging module and acquiring format information indicating a format of the lens module from the installed lens module; a correction part, to which shading correction information is settable, performing shading correction on image data outputted by the imaging module according to the set shading correction information; and a generation and setting part acquiring, from a predetermined device that holds imaging element specification information indicating a size of an imaging element in each imaging module in a form associated with format information of each imaging module installable in the body module and holds optical system specification information indicating a specification of an optical system in each lens module in a form associated with format information of each lens module installable in the body module, the imaging element specification information associated with the format information of the imaging module and the optical system specification information associated with the format information of the lens module acquired by the acquisition part, generating shading correction information corresponding to a combination of the imaging module and the lens module based on the acquired information, and setting the shading correction information to the correction part.

By adopting the above configuration for the image sensor, it is possible to apply shading correction of a content corresponding to the combination of the lens module and the imaging module installed in the body module to the imaging result. Therefore, it is possible to obtain image data with good shading correction with any combination of the lens module and the imaging module installed in the body module.

Further, an image sensor according to another embodiment of the disclosure includes a body module, and a lens module and an imaging module installed in the body module. The imaging module of the image sensor includes: an imaging element; and a correction part, to which shading correction information is settable, performing shading correction on image data outputted by the imaging element according to the set shading correction information. Then, the body module of the image sensor includes: an acquisition part acquiring imaging element specification information indicating a size of the imaging element in the imaging module from the installed imaging module and acquiring optical system specification information indicating a specification of an optical system in the lens module from the installed lens module; and a generation and setting part generating shading correction information corresponding to a combination of the imaging module and the lens module based on the imaging element specification information and the optical system specification information acquired by the acquisition part, and setting the shading correction information to the correction part of the imaging module.

With the image sensor having this configuration, it is possible to apply shading correction of a content corresponding to the combination of the lens module and the imaging module installed in the body module to the imaging result. Therefore, it is possible to obtain image data with good shading correction with any combination of the lens module and the imaging module installed in the body module.

BRIEF DESCRIPTION OF THE DRAWINGS

FIG. 17 is an explanatory diagram showing a configuration example of the imaging element information table.

FIG. 18 is an explanatory diagram showing a configuration example of the exit pupil information table.

FIG. 19 is an explanatory diagram showing a configuration example of the pupil diameter reduction rate table.

DESCRIPTION OF THE EMBODIMENTS

The disclosure has been made in view of the above and aims to provide an image sensor that is configured by a body module and a lens module and an imaging module installed in the body module, and is capable of performing good shading correction on the imaging result regardless of the combination of the lens module and the imaging module that is being used.

The image sensor according to the above embodiment of the disclosure may have a configuration that "the imaging element specification information includes incident angle characteristic information representing an incident angle characteristic of the imaging element and a pixel size and the number of pixels of the imaging element; the optical system specification information includes an exit pupil diameter and an exit pupil position with respect to the optical system; and the generation and setting part of the body module generates the shading correction information in consideration of an incident angle range of light to each of a plurality of pixels of the imaging element based on the imaging element specification information and the optical system specification information acquired by the acquisition part". When this configuration is adopted for the image sensor, the following configuration may be further adopted, that is, "the optical system specification information further includes a peripheral light amount ratio information representing a peripheral light amount ratio of the optical system; and the generation and setting part of the body module generates the shading correction information in consideration of the incident angle range of light to each of a plurality of pixels of the imaging element and the peripheral light amount ratio of the optical system based on the imaging element specification information and the optical system specification information acquired by the acquisition part".

Moreover, in order to perform good shading correction with a zoomable lens module or a lens module having adjustable aperture, the image sensor may have a configuration that "the body module further includes a setting adjustment part adjusting a setting of zoom or aperture of a second type lens module when the installed lens module is the second type lens module with adjustable zoom or aperture; and the generation and setting part of the body module generates the shading correction information in consideration of a zoom setting value or an aperture setting value of the second type lens module when the second type lens module is installed in the body module".

According to the disclosure, it is possible to provide an image sensor that is capable of performing good shading correction on the imaging result regardless of the combination of the lens module and the imaging module that is being used.

Embodiments of the disclosure will be described below with reference to the drawings.

First Embodiment

Figure 1:
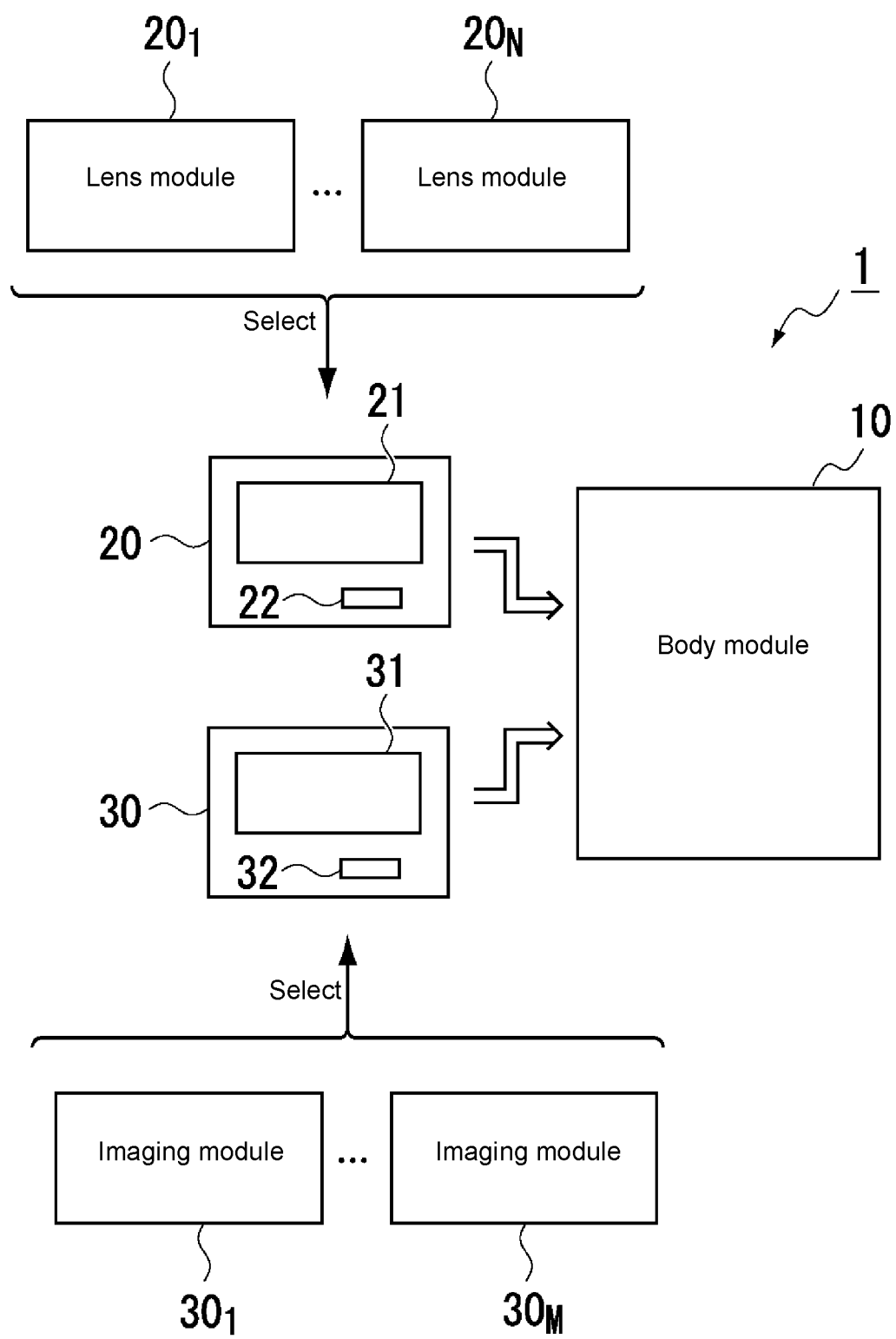
FIG. 1 is an explanatory diagram showing a schematic configuration of the image sensor according to the first embodiment.
Figure 2:
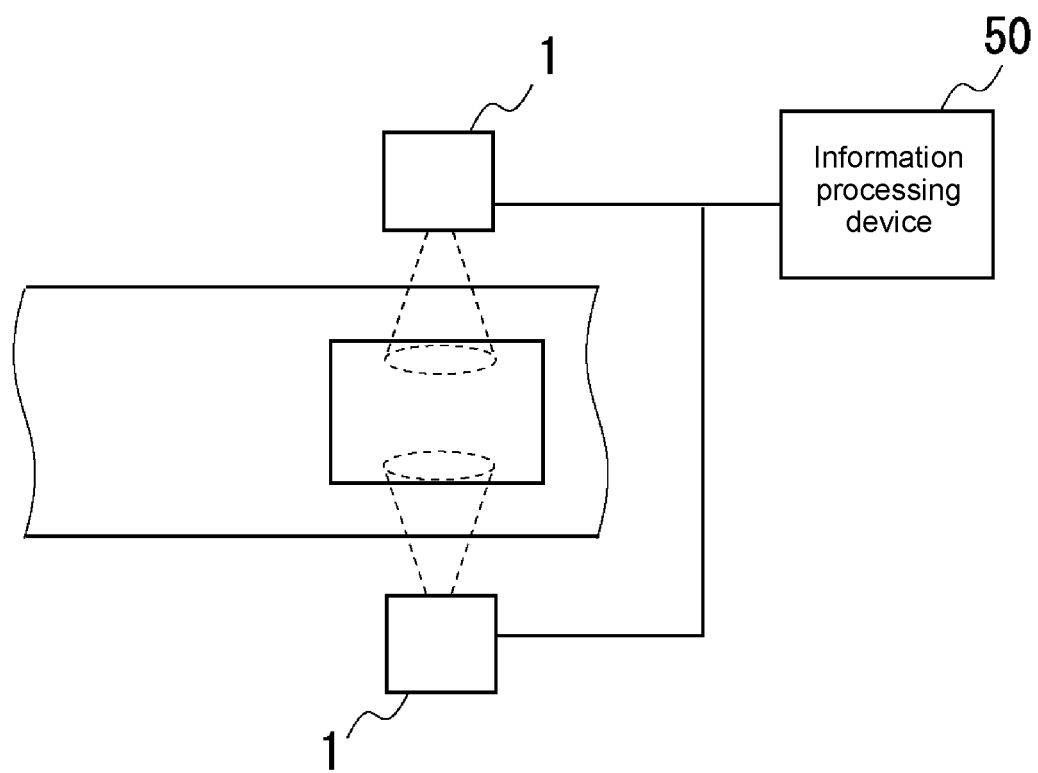
FIG. 2 is an explanatory diagram showing an example of use of the image sensor.

FIG. 1 shows a schematic configuration of an image sensor 1 according to the present embodiment, and FIG. 2 shows an example of use of the image sensor 1.

As shown in FIG. 1, the image sensor 1 of the present embodiment is a device configured by installing a lens module 20 and an imaging module 30 in a body module 10. Moreover, as shown in FIG. 2, the image sensor 1 is developed based on the assumption that it is in a form to be provided at several places of a production line, etc., and is used in a form that the processing result of each image sensor 1 is collected by one information processing device 50.

The imaging module 30 (FIG. 1) is a module including an imaging element 31 such as a CMOS image sensor and a CCD image sensor. M types of imaging modules $30_1$ to $30_M$ having different specifications (pixel size, incident angle characteristic, etc. of the imaging element 31) are prepared as the imaging module 30 for the image sensor 1. A non-volatile memory 32 (the purposes will be described later) such as a serial EEPROM is provided in each imaging module 30.

The lens module 20 is a module including an optical system 21 for imaging the light from an object to be imaged onto an imaging surface of the imaging element 31. N types of lens modules $20_1$ to $20_N$ having different specifications (exit pupil position, exit pupil diameter, etc. of the optical system 21) are prepared as the lens module 20, and a non-volatile memory 22 (the purposes will be described later) such as a serial EEPROM is provided in each lens module 20.

The body module 10 is a module that applies shading correction on the image data from the imaging module 30 and analyzes the image data after shading correction to perform various processes (such as processing of reading barcodes, etc., processing of determining presence/absence of abnormality, etc.).

The degree of shading (luminance unevenness) that occurs in the image data from a certain imaging module 30 changes according to the specification of the imaging element 31 in the imaging module 30 and the specification of the optical system 21 that images the incident light on the imaging surface of the imaging element 31. Therefore, if the content of the shading correction performed by the body module 10 is fixed, it is not possible to obtain the image sensor 1 that can perform good shading correction with any combination of the installed lens module 20 and imaging module 30.

Figure 3:
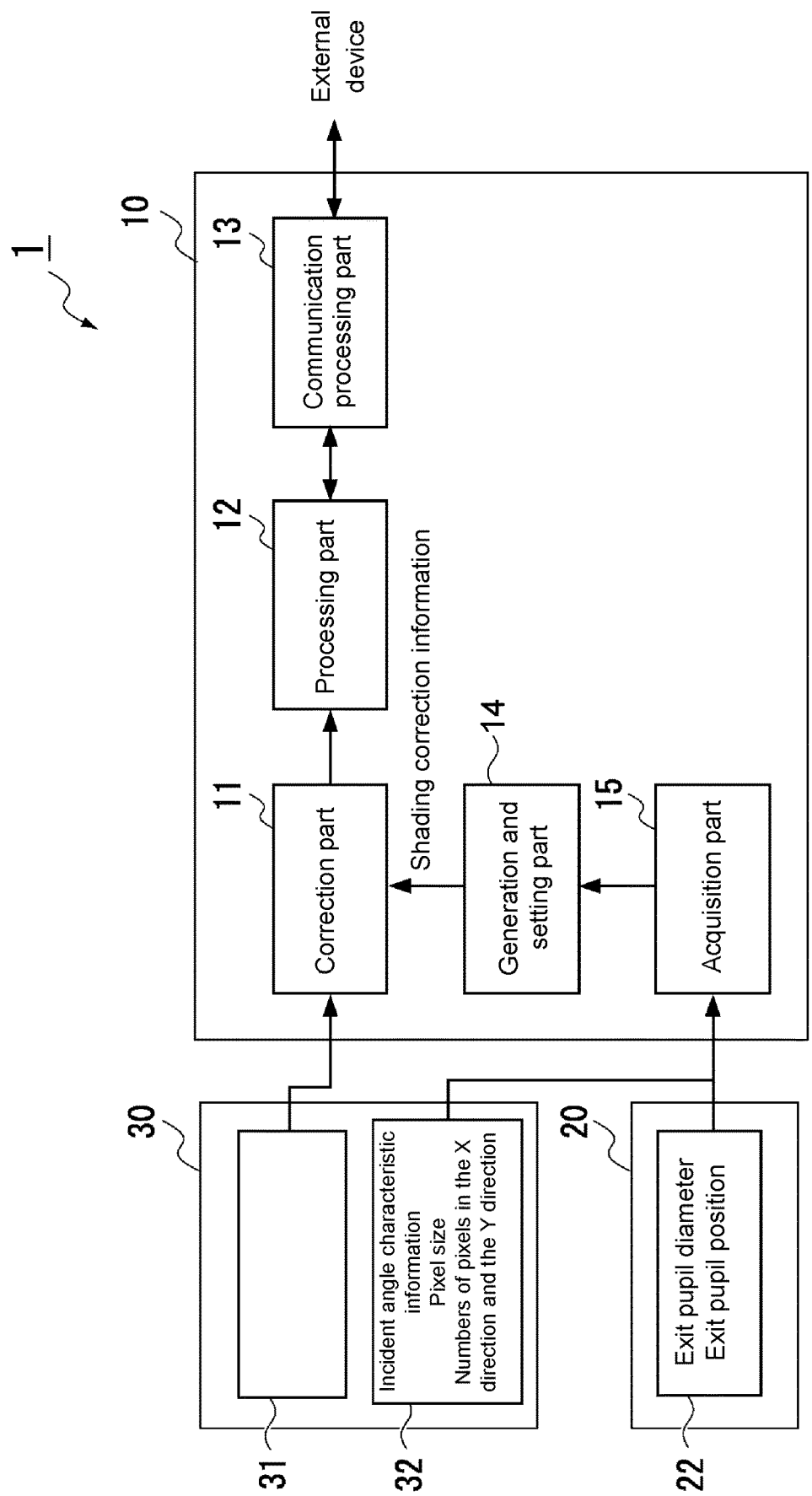
FIG. 3 is a functional block diagram for illustrating the functions of the image sensor according to the first embodiment.

In order to perform good shading correction for all combinations of the lens module 20 and the imaging module 30, the configuration shown in FIG. 3 is adopted for the image sensor 1 according to the present embodiment.

That is, an entrance pupil diameter and an entrance pupil position of the optical system 21 in the lens module 20 are stored in the non-volatile memory 22 of each lens module 20 for the image sensor 1. Further, incident angle characteristic information representing an incident angle characteristic of the imaging element 31 in the imaging module 30, the pixel size, the number of pixels in the X direction, and the number of pixels in the Y direction of the imaging element 31 are stored in the non-volatile memory 32 of each imaging module 30 for the image sensor 1. Here, the number of pixels in the X direction is the number of pixels in the longitudinal direction of the imaging element 31, and the number of pixels in the Y direction is the number of pixels of the imaging element 31 in the direction orthogonal to the X direction. The incident angle characteristic information stored in the non-volatile memory 32 usually includes information representing the incident angle characteristic in the X direction and information representing the incident angle characteristic in the Y direction. However, if the incident angle characteristic in the X direction substantially matches the incident angle characteristic in the Y direction, the incident angle characteristic information may be information representing only the incident angle characteristic in the X direction.

In addition, the body module 10 of the image sensor 1 includes a correction part 11, a processing part 12, a communication processing part 13, a generation and setting part 14, and an acquisition part 15. Each part of the body module 10 shown in FIG. 3 is a so-called functional block. The correction part 11 is realized by, for example, an image processing IC (FPGA, ASIC, etc.), and the communication processing part 13 is realized by, for example, a network interface circuit. In addition, the processing part 12, the generation and setting part 14, and the acquisition part 15 are realized by, for example, a microcontroller storing programs for the image sensor 1.

The correction part 11 is a unit that applies shading correction of a content defined by the set shading correction information on the image data from the imaging module 30. For example, a unit having the configuration shown in FIG. 5, in which shading correction information having the configuration shown in FIG. 4 is set, is used as the correction part 11.

The shading correction information (FIG. 4) is shading correction information for the imaging module 30 that includes the imaging element 31 having 640×480 pixels. As shown in the figure, the shading correction information includes X direction correction information (the information in the upper part of FIG. 4) that defines the correction gain to be multiplied by the luminance value of each pixel whose y coordinate is 240 for each x coordinate, and Y direction correction information (the information in the lower part of FIG. 4) that defines the correction gain to be multiplied by the luminance value of each pixel whose x coordinate is 320 for each y coordinate.

Figures 4, 5:
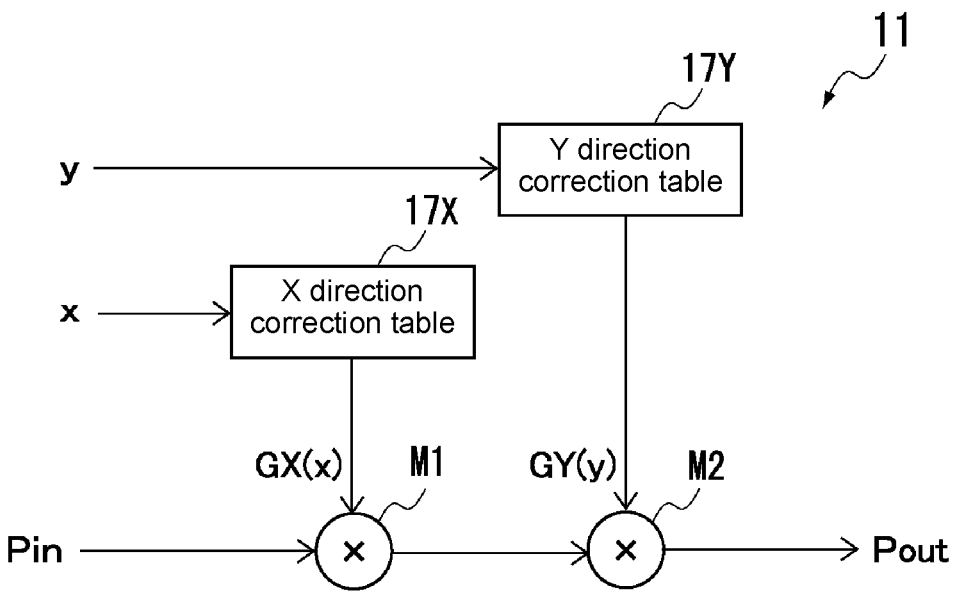
FIG. 4 is an explanatory diagram showing an example of the shading correction information.
FIG. 5 is a functional block diagram of the correction part.

The X direction correction table 17X and the Y direction correction table 17Y included in the correction part 11 (FIG. 5) are tables (so-called lookup tables) for setting the X direction correction information and the Y direction correction information in the shading correction information (FIG. 4). A multiplier M1 is a unit that multiplies the correction gain GX(x) associated with the coordinate x in the X direction correction information by the luminance value Pin of the pixel at the coordinates x, y. A multiplier M2 is a unit that multiplies the correction gain GY(y) associated with the coordinate y in the Y direction correction information by the output of the multiplier M1 and outputs it as a processing result Pout.

Returning to FIG. 3, description of the body module 10 will be continued hereinafter. The processing part 12 is a unit that analyzes the image data after shading correction to perform various processes (such as processing of reading codes, processing of determining presence/absence of abnormality, etc.). The communication processing part 13 is a unit that the processing part 12 uses for communicating with an external device (information processing device 50).

The acquisition part 15 is a unit that, when the body module 10 is powered on, reads various information from the non-volatile memory 22 of the lens module 20 installed in the body module 10 and the non-volatile memory 32 of the imaging module 30 and notifies the generation and setting part 14 of the various information.

The generation and setting part 14 is a unit that generates the shading correction information suitable for the combination of the lens module 20 and the imaging module 30 that is being used in the image sensor 1, based on the various information notified from the acquisition part 15, and sets it to the correction part 11.

Figure 6:
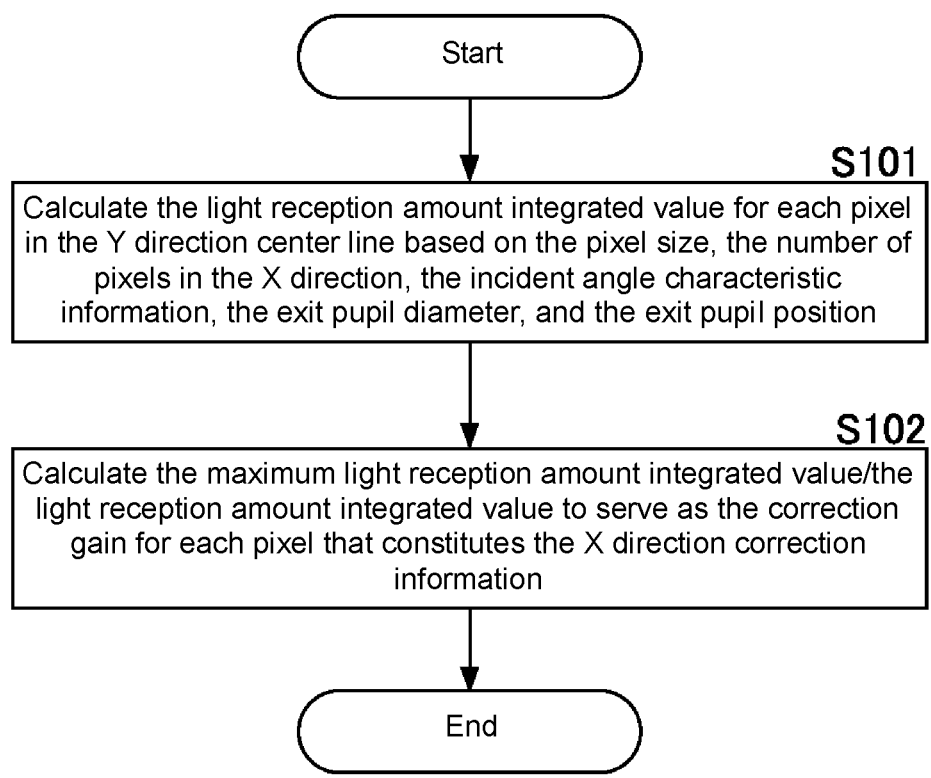
FIG. 6 is a flowchart of the X direction correction information generation process executed by the body module of the image sensor according to the first embodiment.

A generation procedure of the shading correction information (the X direction correction information and the Y direction correction information) performed by the generation and setting part 14 will be described below. The generation and setting part 14 generates the X direction correction information by an X direction correction information generation process in the procedure shown in FIG. 6.

That is, when the X direction correction information is generated, the generation and setting part 14 first calculates a light reception amount integrated value for each pixel in the Y direction center line of the imaging element 31 based on the pixel size, the number of pixels in the X direction, the incident angle characteristic information, the exit pupil diameter, and the exit pupil position notified from the acquisition part 15 (step S101).

Figure 7A:
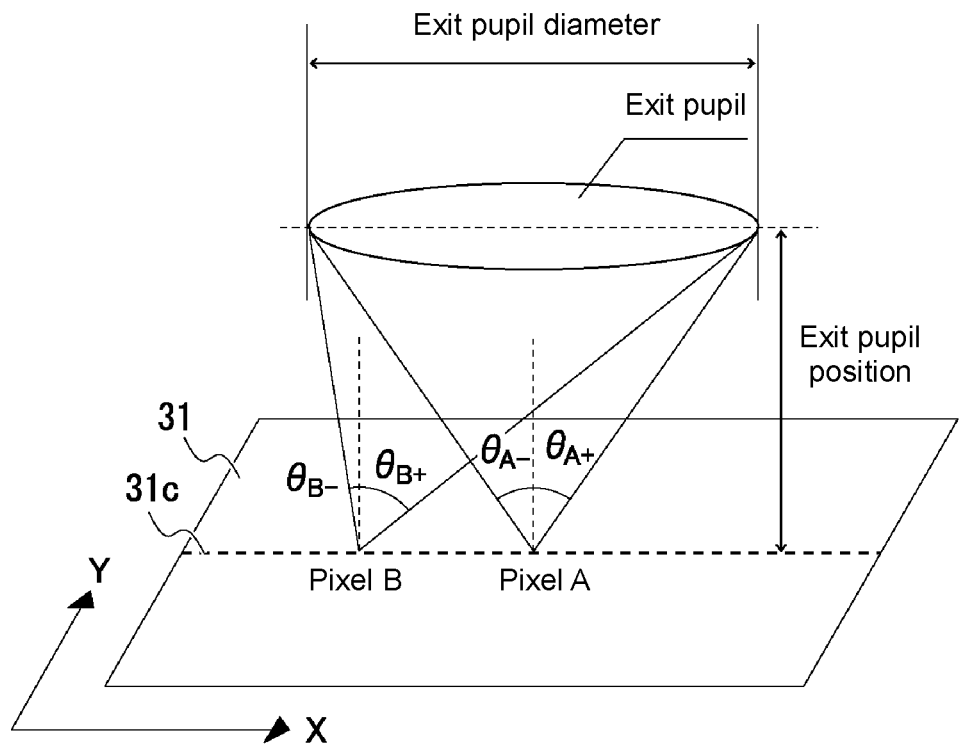
FIG. 7A is a diagram for illustrating the content of the processing in step S101 of the X direction correction information generation process.
Figure 7B:
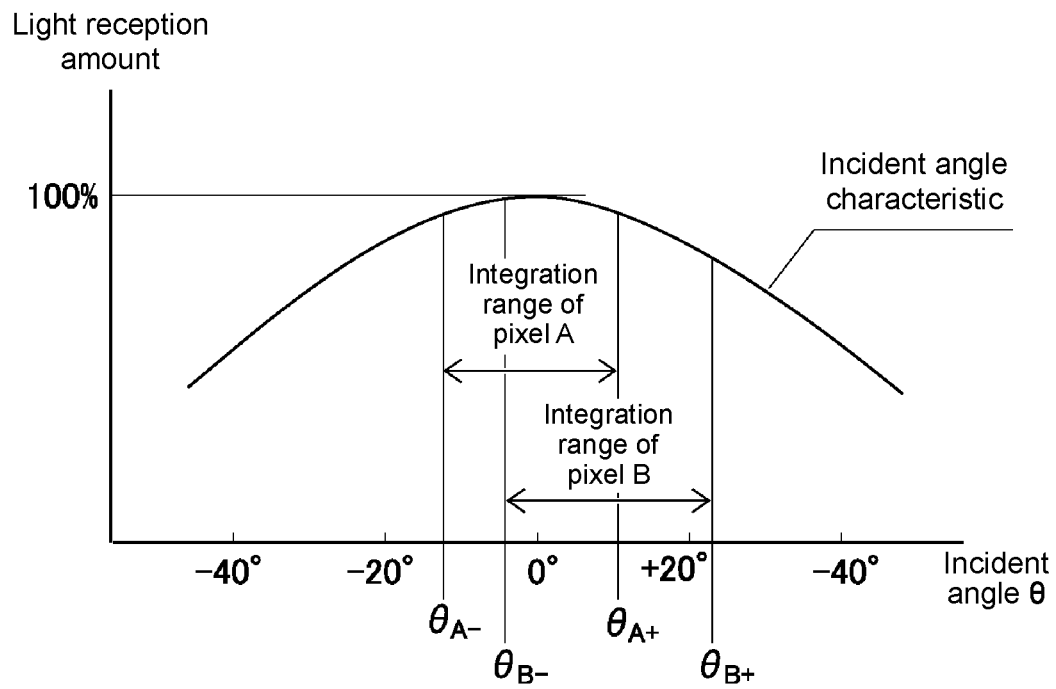
FIG. 7B is a diagram for illustrating the content of the processing in step S101 of the X direction correction information generation process.

Here, the Y direction center line is a pixel group 31c positioned in the center of the imaging element 31 in the Y direction, as shown in FIG. 7A. In step S101, the generation and setting part 14 specifies the incident angle range (for example, incident angle range $\theta_{A-} \sim \theta_{A+}$ and incident angle range $\theta_{B-} \sim \theta_{B+}$) to each pixel (for example, pixels A and B) in the Y direction center line based on the pixel size, the number of pixels in the X direction, the exit pupil diameter, and the exit pupil position (see FIG. 7A). Then, as shown in FIG. 7B, the generation and setting part 14 integrates the light reception amount in the incident angle range to each pixel in the Y direction center line, indicated by the incident angle characteristic information, to calculate the light reception amount integrated value for each pixel.

Figure 7C:
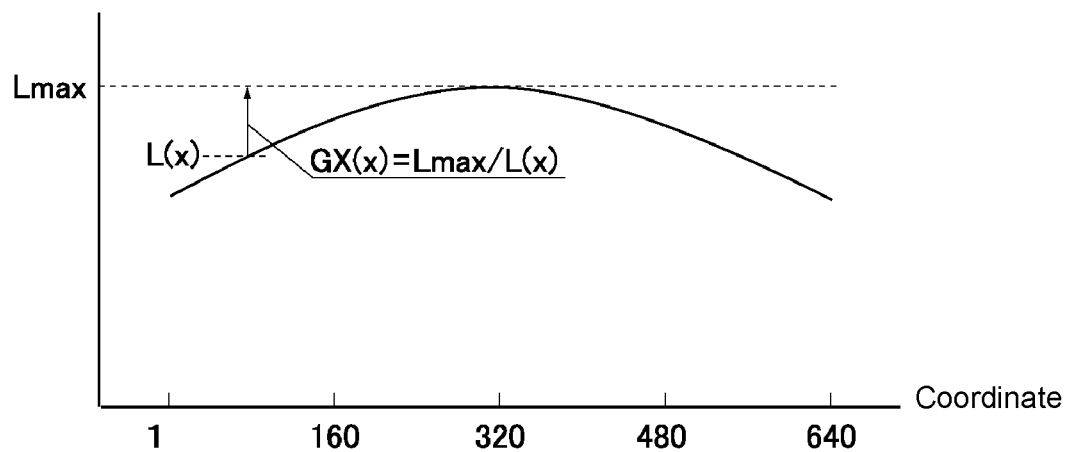
FIG. 7C is a diagram for illustrating the content of step S102 of the X direction correction information generation process.

The generation and setting part 14 that has finished the process of step S101 calculates a value by dividing the maximum light reception amount integrated value by the light reception amount integrated value of each pixel, to serve as the correction gain for each pixel that constitutes the X direction correction information (step S102). That is, as schematically shown in FIG. 7C, the generation and setting part 14 generates the X direction correction information by calculating the maximum light reception amount integrated value Lmax/the light reception amount integrated value L(x), to serve as the correction gain GX(x) for each pixel in the Y direction center line.

The generation and setting part 14 also generates the Y direction correction information in the same procedure. If the incident angle characteristic in the X direction and the incident angle characteristic in the Y direction of the imaging element 31 substantially match each other, the Y direction correction information may be generated by extracting a part of the X direction correction information (information corresponding to the number of pixels in the Y direction at the center) instead of the procedure as described above.

The generation and setting part 14 sets the shading correction information (the X direction correction information and the Y direction correction information) generated as described above to the correction part 11. Therefore, the correction part 11 can apply shading correction of the content suitable for the combination of the lens module 20 and the imaging module 30 installed in the body module 10 to the image data from the imaging module 30. Accordingly, by adopting the above configuration, it is possible to realize the image sensor 1, which allows the user to select the lens module 20 and the imaging module 30 without concern about the performance deterioration caused by shading.

Second Embodiment

Hereinafter, the configuration and operation of the image sensor 1 according to the second embodiment will be described focusing on the portions different from the image sensor 1 according to the first embodiment using the same reference numerals as those in the description of the image sensor 1 according to the first embodiment. For convenience of explanation, in the following description, the image sensor 1 according to the $L^{th}$ (L=1 to 4) embodiment and the body module 10 of the image sensor 1 according to the $L^{th}$ embodiment are also denoted as the $L^{th}$ image sensor 1 and the $L^{th}$ body module 10.

Figure 8:
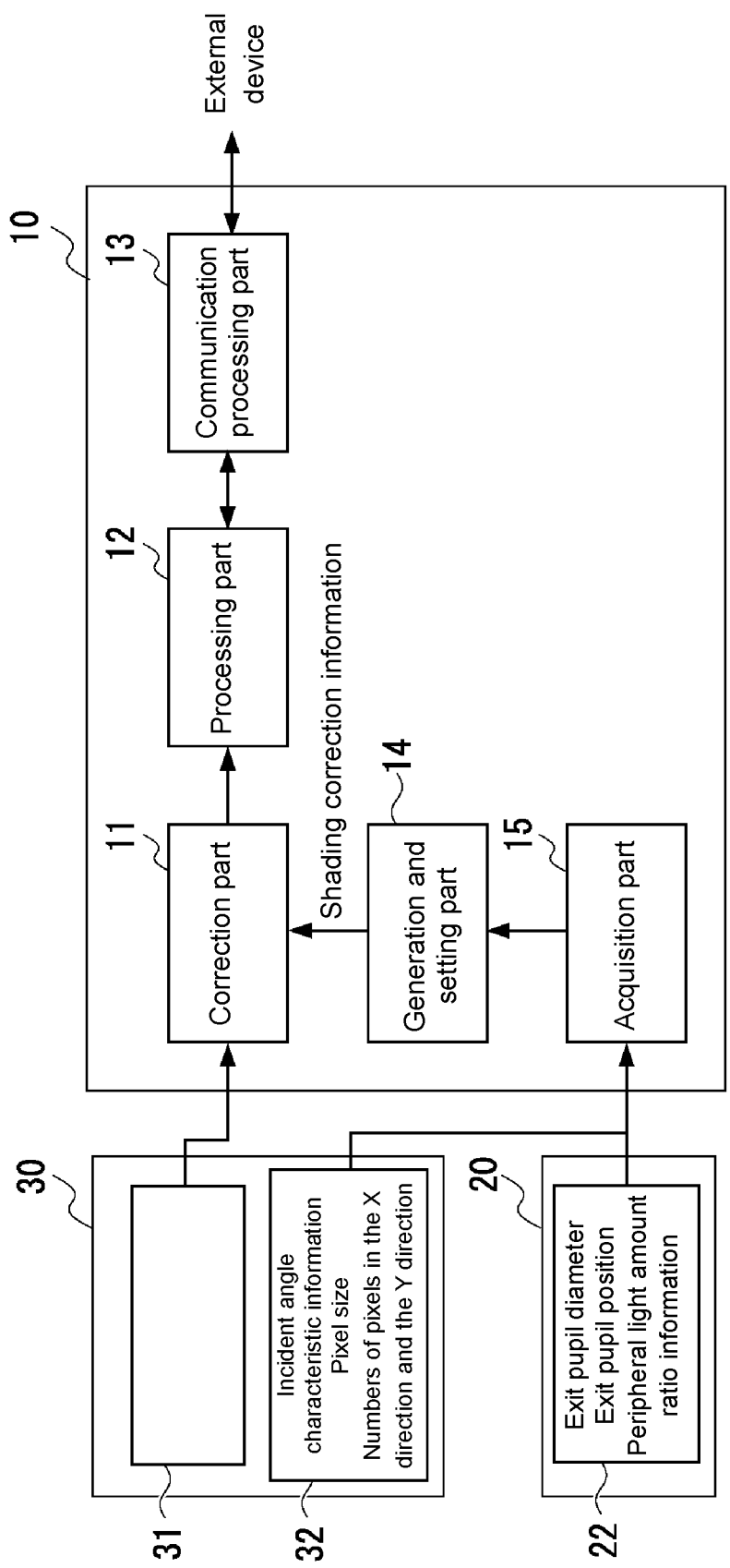
FIG. 8 is a functional block diagram for illustrating the functions of the image sensor according to the second embodiment.

FIG. 8 shows a schematic configuration of the second image sensor 1 (the image sensor 1 according to the second embodiment).

Each imaging module 30 for the second image sensor 1 is the same as the imaging module 30 for the first image sensor 1. On the other hand, each lens module 20 for the second image sensor 1 is different from the lens module 20 for the first image sensor 1. As shown in the figure, the non-volatile memory 22 of each lens module 20 for the second image sensor 1 further stores peripheral light amount ratio information indicating the peripheral light amount ratio of the optical system 21 in addition to the entrance pupil diameter and entrance pupil position of the optical system 21 in the lens module 20.

Then, the second body module 10 is a modification of the first body module 10 so that the shading correction information is generated by the generation and setting part 14 also using the peripheral light amount ratio information.

Figure 9:
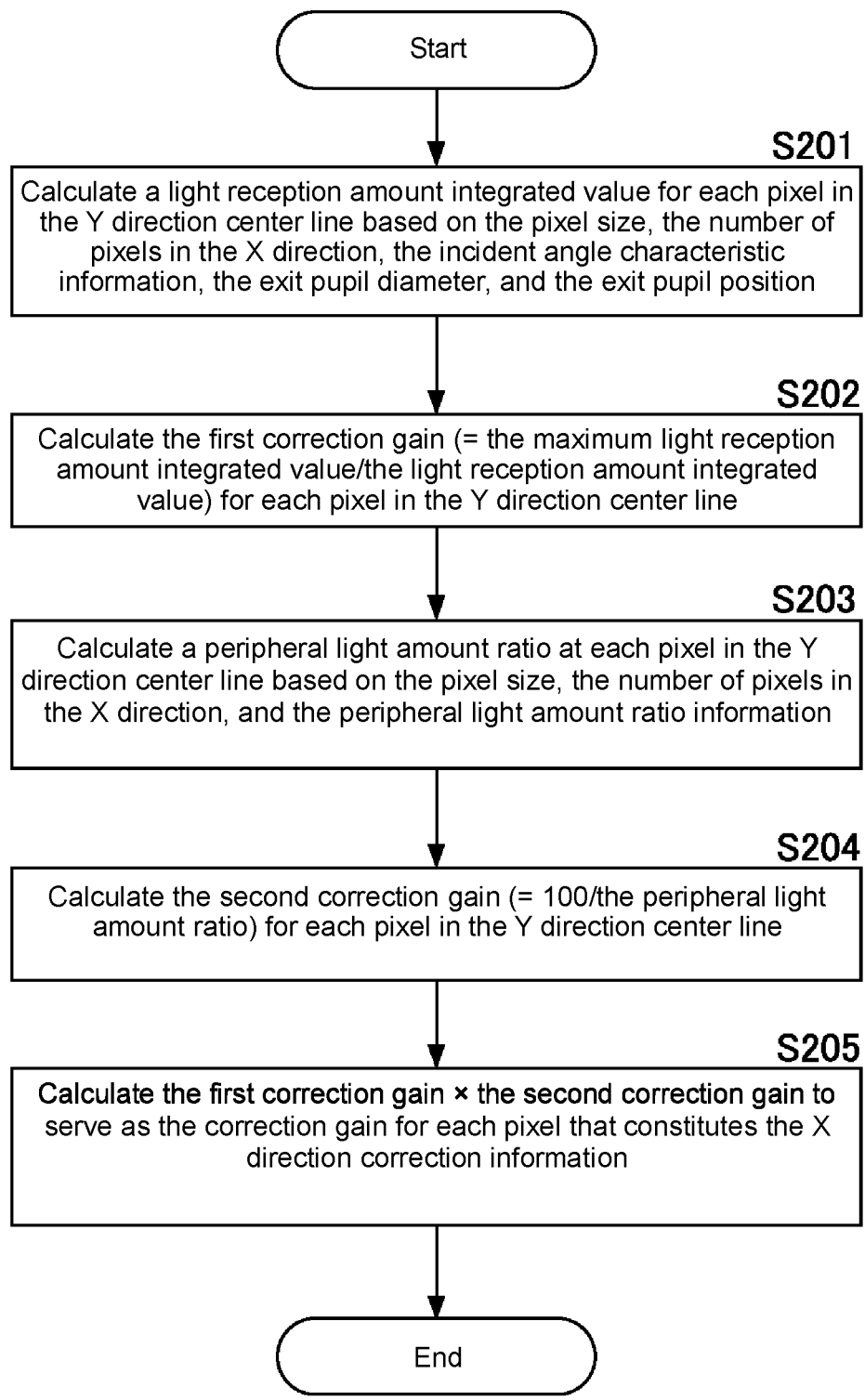
FIG. 9 is a flowchart of the X direction correction information generation process executed by the body module of the image sensor according to the second embodiment.

Specifically, the generation and setting part 14 of the second body module 10 generates the X direction correction information by the X direction correction information generation process in the procedure shown in FIG. 9 when generating the shading correction information.

That is, at the time of generating the X direction connection information which is an element of the shading correction information, the generation and setting part 14 first calculates a light reception amount integrated value for each pixel in the Y direction center line of the imaging element 31 based on the pixel size, the number of pixels in the X direction, the incident angle characteristic information, the exit pupil diameter, and the exit pupil position notified from the acquisition part 15 (step S201). Then, the generation and setting part 14 calculates a value by dividing the maximum light reception amount integrated value by the light reception amount integrated value of each pixel, to serve as the first correction gain for each pixel in the Y direction center line (step S202). That is, in this step S202, the generation and setting part 14 generates the same information (first correction gain group) as the X direction correction information (correction gain group) generated by the generation and setting part 14 of the first body module 10.

Figure 10:
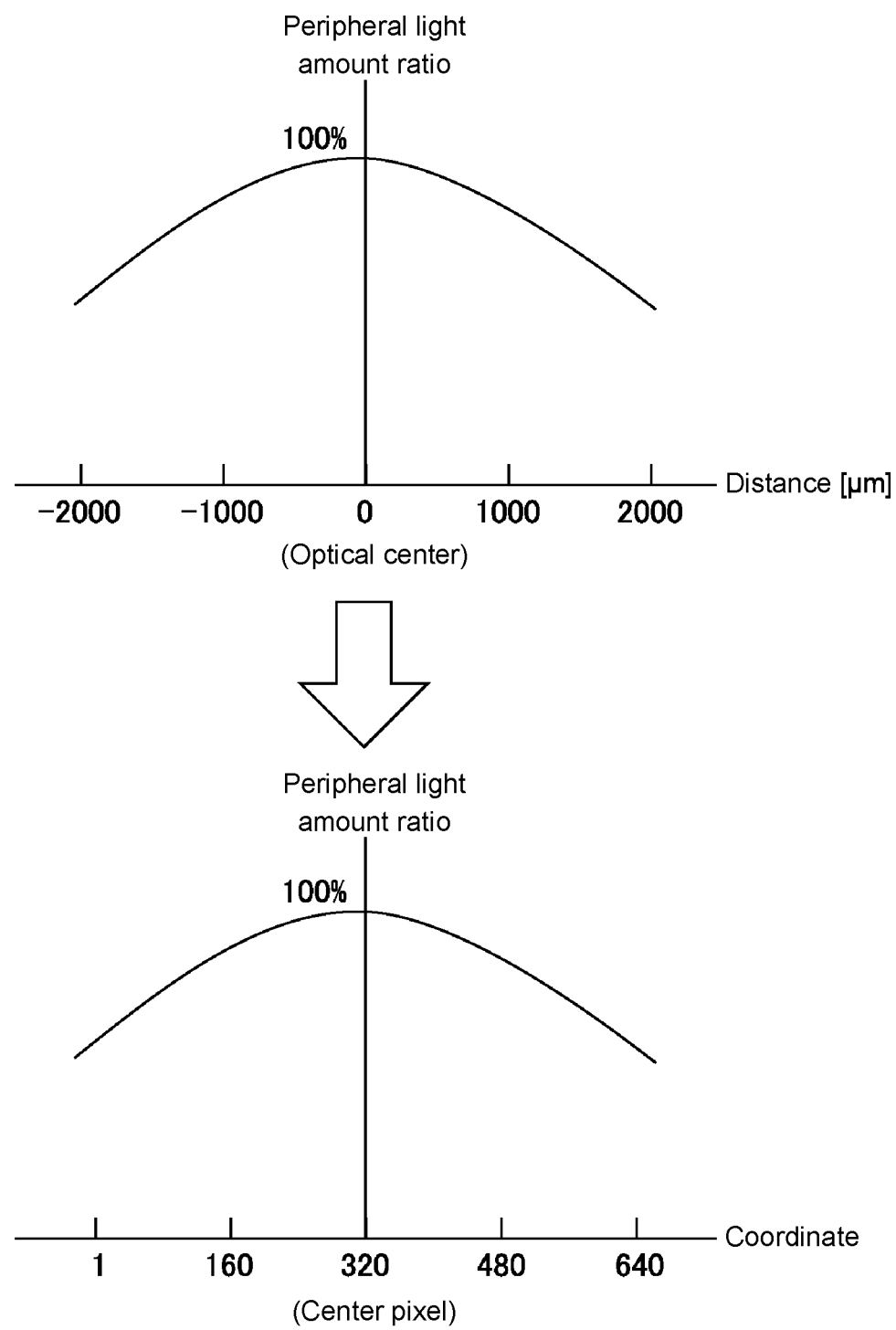
FIG. 10 is a diagram for illustrating the content of the processing in step S203 of the X direction correction information generation process (FIG. 9).

Thereafter, the generation and setting part 14 calculates a peripheral light amount ratio at each pixel in the Y direction center line based on the pixel size, the number of pixels in the X direction, and the peripheral light amount ratio information (step S203). As schematically shown in FIG. 10, the process of this step S203 is a process of calculating the peripheral light amount ratio (the unit is %) at each pixel in the Y direction center line from the peripheral light amount ratio information which represents the relationship between the distance from the optical center and the peripheral light amount ratio.

The generation and setting part 14 that has finished the process of step S203 calculates the second correction gain with respect to each pixel in the Y direction center line by calculating 100/the peripheral light amount ratio of each pixel (step S204). Then, the generation and setting part 14 calculates the correction gain for each pixel that constitutes the X direction correction information by calculating the first correction gain×the second correction gain for each pixel (step S205).

The generation and setting part 14 also generates the Y direction correction information in the same procedure. If the incident angle characteristic in the X direction and the incident angle characteristic in the Y direction of the imaging element 31 substantially match each other, the Y direction correction information may be generated by extracting a part of the X direction correction information (information corresponding to the number of pixels in the Y direction at the center) instead of the procedure as described above.

The generation and setting part 14 of the second body module 10 sets the shading correction information (the X direction correction information and the Y direction correction information) generated as described above to the correction part 11. Therefore, the correction part 11 can reduce the luminance unevenness that occurs in the image data from the imaging module 30 due to the peripheral light amount ratio. Accordingly, by adopting the above configuration, it is possible to realize the image sensor 1 which performs better shading correction than the image sensor 1 according to the first embodiment.

Third Embodiment

Hereinafter, the configuration and operation of the image sensor 1 according to the present embodiment will be described focusing on the portions different from the first image sensor 1 using the same reference numerals as those in the description of the first image sensor 1 (the image sensor 1 according to the first embodiment).

Figure 11:
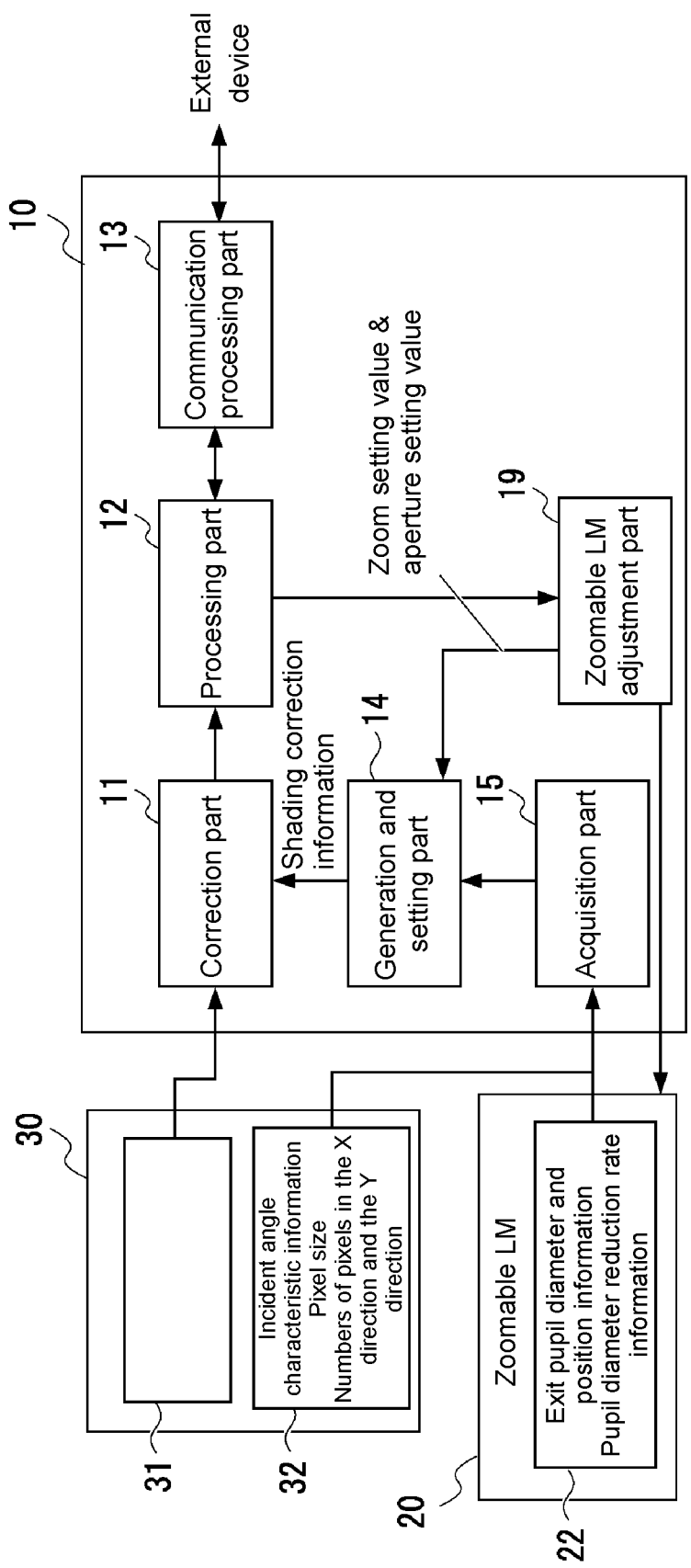
FIG. 11 is a functional block diagram for illustrating the functions of the image sensor according to the third embodiment.

FIG. 11 shows a schematic configuration of the third image sensor 1 (the image sensor 1 according to the third embodiment).

The third image sensor 1 is a device configured by installing the lens module 20 and the imaging module 30 in the body module 10, like the first image sensor 1 (see FIG. 1). The imaging module 30 for the third image sensor 1 is the same as the imaging module 30 for the first image sensor 1. However, the lens module 20 for the third image sensor 1 includes K (≥1) types of lens modules 20 (hereinafter referred to as zoomable LM 20) with changeable zoom and aperture.

Therefore, the body module 10 of the third image sensor 1 is provided with a zoomable LM adjustment part 19 for changing zoom/aperture-related settings of the zoomable LM 20. The zoomable LM adjustment part 19 has a function of notifying the generation and setting part 14 of the current (after change) zoom setting value and aperture setting value when the settings of zoom/aperture are changed, and a function of notifying the generation and setting part 14 of the current zoom setting value and aperture setting value in response to a predetermined request from the generation and setting part 14.

Further, a non-volatile memory 22 of each zoomable LM 20 for the third image sensor 1 stores exit pupil diameter and position information and pupil diameter reduction rate information.

Figures 12, 13:
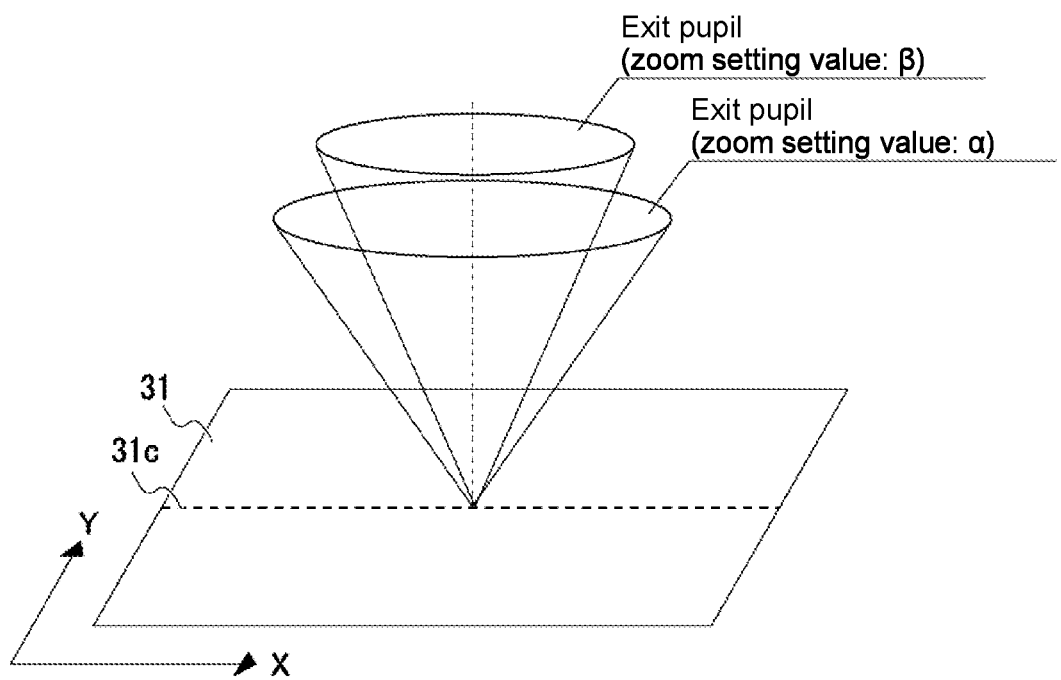
FIG. 12 is an explanatory diagram of the exit pupil diameter and position information.
FIG. 13 is an explanatory diagram showing a configuration example of the exit pupil diameter and position information.

The exit pupil diameter and position information is information indicating the relationship between the zoom setting value (setting value of the zoom magnification) of the zoomable LM 20 and the exit pupil diameter and the exit pupil position. That is, when the zoom setting value (for example, zoom setting values α and β) is changed, as shown schematically in FIG. 12, the diameter and position of the exit pupil change. The exit pupil diameter and position information is information indicating the relationship between the zoom setting value and the exit pupil diameter and the exit pupil position. The information of the configuration (data structure) shown in FIG. 13, for example, is used as the exit pupil diameter and position information.

Figures 14, 15:
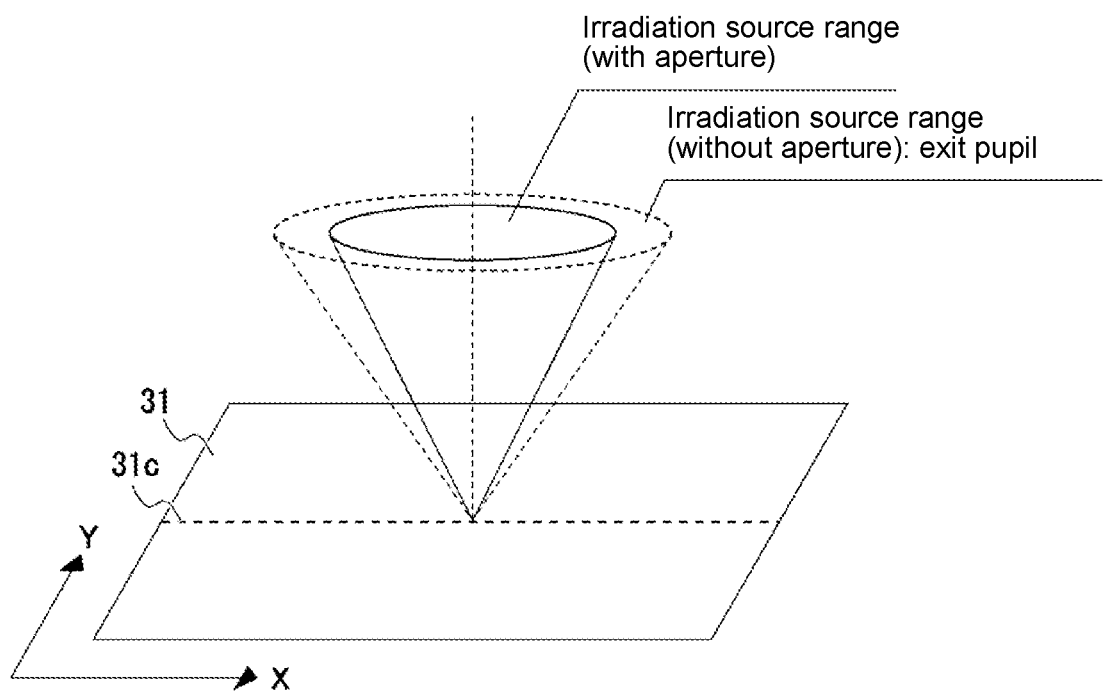
FIG. 14 is an explanatory diagram of the pupil diameter reduction rate information.
FIG. 15 is an explanatory diagram showing a configuration example of the pupil diameter reduction rate information.

In addition, when the aperture (F value) of the zoomable LM 20 is changed, as schematically shown in FIG. 14, the diameter of the irradiation source range of the light to the imaging element 31 decreases according to the aperture (F value). The pupil diameter reduction rate information is information indicating the relationship between the aperture setting value (setting value of the F value) and "diameter of the actual irradiation source range"/"diameter of the irradiation source range without the aperture (that is, exit pupil)" (hereinafter referred to as exit pupil reduction rate). The information of the configuration shown in FIG. 15, for example, is used as the pupil diameter reduction rate information.

Then, the body module 10 of the third image sensor 1 is configured (programmed) so that the generation and setting part 14 performs the following processing.

When notified of various pieces of information from the acquisition part 15, the generation and setting part 14 determines whether the lens module 20 installed in the body module 10 is the zoomable LM 20 based on whether it is notified of the exit pupil diameter and position information and the pupil diameter reduction rate information. If the lens module 20 installed in the body module 10 is not the zoomable LM 20, the generation and setting part 14 generates the shading correction information in the same procedure as the generation and setting part 14 in the first body module 10 and sets the shading correction information to the correction part 11.

On the other hand, if the lens module 20 installed in the body module 10 is the zoomable LM 20, the generation and setting part 14 acquires the current zoom setting value and aperture setting value from the zoomable LM adjustment part 19. Then, the generation and setting part 14 grasps the current exit pupil diameter and the exit pupil position of the zoomable LM 20 from the exit pupil diameter and position information notified from the acquisition part 15 and the acquired zoom setting value. In addition, the generation and setting part 14 specifies the exit pupil diameter reduction rate of the current aperture setting value from the pupil diameter reduction rate information notified from the acquisition part 15 and the acquired aperture setting value. Further, the generation and setting part 14 calculates the exit pupil diameter considering the aperture by multiplying the exit pupil diameter which has been grasped by the specified exit pupil diameter reduction rate.

Then, the generation and setting part 14 generates the shading correction information by processes of the same procedure as that performed by the generation and setting part 14 in the first body module 10, based on the exit pupil position as acquired and the exit pupil diameter considering the aperture, and sets the shading correction information to the correction part 11.

In addition, when notified of the current zoom setting value and aperture setting value from the zoomable LM adjustment part 19, the generation and setting part 14 generates the shading correction information in the above procedure, based on the exit pupil diameter and position information and the pupil diameter reduction rate information, which are notified from the acquisition part 15 at power on and held internally, and the zoom setting value and the aperture setting value notified from the zoomable LM adjustment part 19, and sets the shading correction information to the correction part 11.

As described above, even if the zoom/aperture of the zoomable LM 20 is changed, the body module 10 of the image sensor 1 according to the present embodiment can apply shading correction of the content according to the situation after change on the image data from the imaging module 30. Accordingly, by adopting the above configuration, it is possible to realize the image sensor 1, which allows the user to select the lens module 20 and the imaging module 30 without concern about the performance deterioration caused by shading, and to select the zoomable LM 20 as the lens module 20.

Fourth Embodiment

Figure 16:
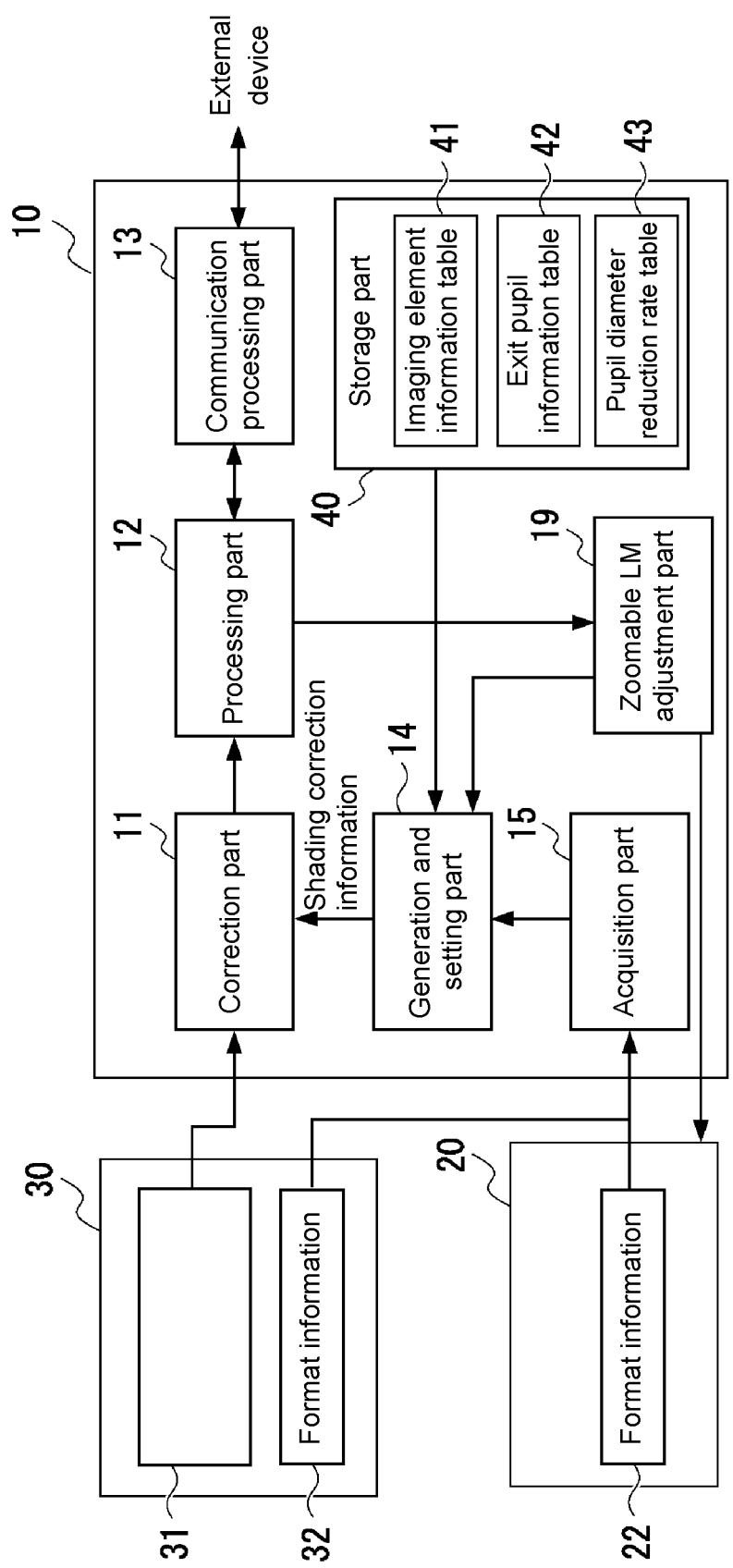
FIG. 16 is a functional block diagram for illustrating the functions of the image sensor according to the fourth embodiment.

FIG. 16 shows a schematic configuration of the fourth image sensor 1 (the image sensor 1 according to the fourth embodiment). The fourth image sensor 1 is a modification of the third image sensor 1 (FIG. 11). Hereinafter, the configuration and operation of the fourth image sensor 1 will be described focusing on the portions different from the third image sensor 1.

The fourth image sensor 1 is a device in which lens modules 20 and imaging modules 30 of various specifications are prepared as available modules, like the third image sensor 1 (and the first and second image sensors 1). The lens modules 20 for the fourth image sensor 1 also include the zoomable LM 20, like the third image sensor 1.

However, the non-volatile memory 22 of each lens module 20 for the fourth image sensor 1 stores format information indicating the format of the lens module 20. In addition, the non-volatile memory 32 of each imaging module 30 for the fourth image sensor 1 stores format information indicating the format of the imaging module 30.

In the fourth body module 10 (the body module 10 of the fourth image sensor 1), a storage part 40 is provided for storing an imaging element information table 41, an exit pupil information table 42, and a pupil diameter reduction rate table 43.

FIG. 17, FIG. 18, and FIG. 19 respectively show configuration examples of the imaging element information table 41, the exit pupil information table 42, and the pupil diameter reduction rate table 43. As shown in FIG. 17, the imaging element information table 41 is a table that stores the pixel size of the imaging element 31 in each imaging module 30, the number of pixels in the X direction, the number of pixels in the Y direction, and the incident angle characteristic information in a form associated with the format information of each imaging module 30.

The exit pupil information table 42 (FIG. 18) is a table that stores information indicating the relationship between the zoom setting value and the exit pupil diameter and the exit pupil position with respect to the zoomable LM 20 and the exit pupil diameter and the exit pupil position with respect to the lens module 20 having no zoom function in a form associated with the format information of each lens module 20. The pupil diameter reduction rate table 43 (FIG. 19) is a table that stores information indicating the relationship between the aperture setting value (setting value of the F value) of each zoomable LM 20 and the exit pupil reduction rate in a form associated with the format information of each zoomable LM 20.

That is, the same information (FIG. 18, FIG. 19) as that stored in the non-volatile memory 22 of each lens module 20 for the third image sensor 1 is stored in the storage part 40 of the fourth body module 10 for each format information. Further, the same information (FIG. 17) as that stored in the non-volatile memory 32 of each imaging module 30 for the third image sensor 1 is stored in the storage part 40 for each format information.

Therefore, the fourth body module 10 is configured so that the generation and setting part 14 performs substantially the same processing as the generation and setting part 14 in the third body module 10 based on the LM format information and the CM format information notified from the acquisition part 15.

Specifically, the generation and setting part 14 of the fourth body module 10 reads information associated with the LM format information from the imaging element information table 41 when the LM format information and the CM format information are notified from the acquisition part 15 by powering on the fourth body module 10. In addition, the generation and setting part 14 determines whether the lens module 20 installed in the body module 10 is the zoomable LM 20 based on the LM format information. If the lens module 20 installed in the body module 10 is not the zoomable LM 20, the generation and setting part 14 reads the exit pupil diameter and the exit pupil position associated with the LM format information from the exit pupil information table 42. Then, the generation and setting part 14 generates the shading correction information in the same procedure as the generation and setting part 14 in the third body module 10 and sets the shading correction information to the correction part 11.

On the other hand, if the lens module 20 installed in the body module 10 is the zoomable LM 20, the generation and setting part 14 reads information associated with the LM format information from the exit pupil information table 42 and the pupil diameter reduction rate table 43. In addition, the generation and setting part 14 acquires the current zoom setting value and aperture setting value from the zoomable LM adjustment part 19. Then, the generation and setting part 14 generates the shading correction information in the same procedure as the generation and setting part 14 in the third body module 10 based on the information as collected and sets the shading correction information to the correction part 11.

By adopting the configuration of the image sensor 1 according to the present embodiment as described above, it is also possible to realize the image sensor 1, which allows the user to select the lens module 20 and the imaging module 30 without concern about the performance deterioration caused by shading, and to select the zoomable LM 20 as the lens module 20.

Modified Example

Various modifications may be made to the image sensor 1 according to each of the embodiments described above. For example, an external device (information processing device 50, another image sensor 1, a storage on the Internet, etc.) that holds the imaging element information table 41, the exit pupil information table 42, and the pupil diameter reduction rate table 43 may be prepared, and the body module 10 of the image sensor 1 according to the fourth embodiment may be modified into a module that acquires information required for generating the shading correction information by accessing the external device.

Figure 20:
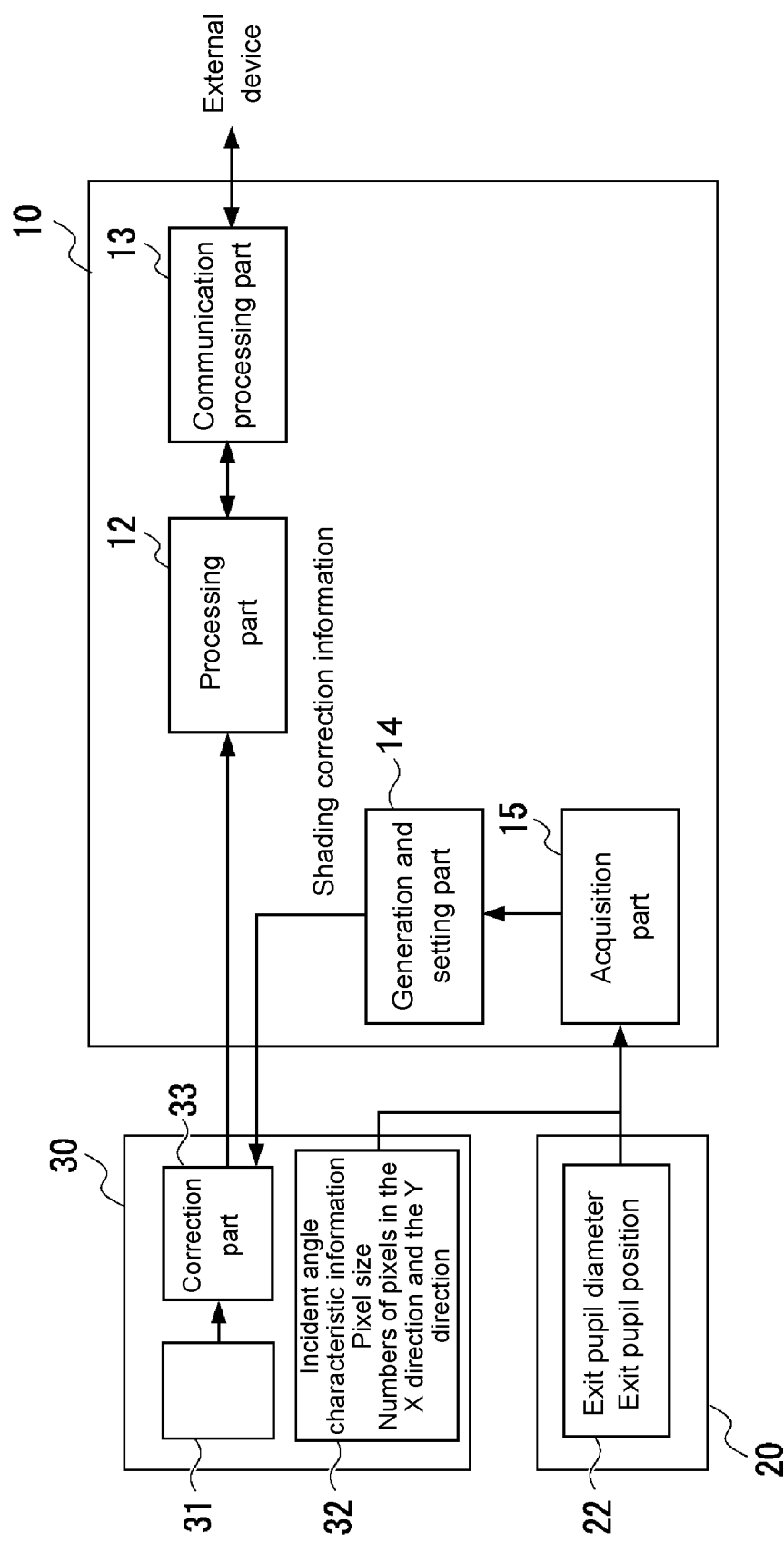
FIG. 20 is a diagram for illustrating a modified example of the image sensor.

Besides, the image sensor 1 according to the first embodiment may be modified to have the configuration shown in FIG. 20. That is, the correction part 33 for performing shading correction may be provided on the side of the imaging module 30. The same modification can also be made to the image sensors 1 according to other embodiments. The image sensor 1 according to the third embodiment may be modified into a device in which a part or all of the prepared lens modules 20 have either adjustable zoom or adjustable aperture.

The information stored in the non-volatile memory 22 of the lens module 20 and the non-volatile memory 32 of the imaging module 30 may not be the same as the above information. For example, if the imaging elements 31 of the imaging modules 30 that can be installed in the body module 10 have the same pixel size, it is not necessary to store the pixel size in the non-volatile memory 32 of each imaging module 30.

Figure 21:
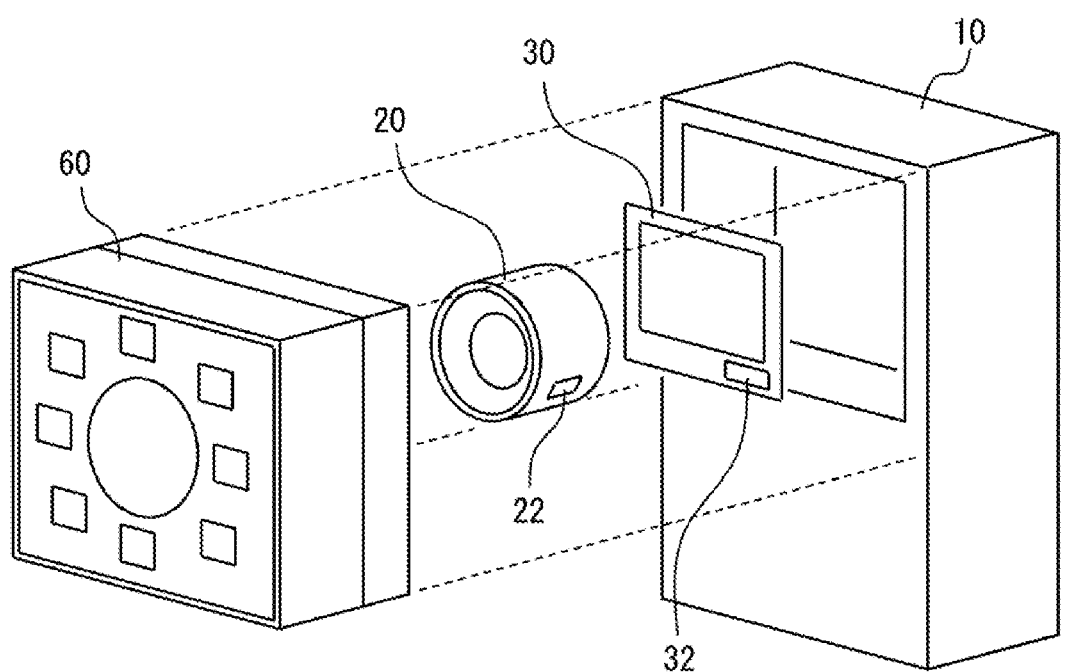
FIG. 21 is a diagram for illustrating another modified example of the image sensor.

Further, the lens module 20 may be modified to include a light source (LED, etc.) for illuminating the subject. In addition, as schematically shown in FIG. 21, the body module 10 may be modified for installing an illumination module 60 that includes a light source for illuminating the subject. Regarding the forms in which the smart camera is provided (delivery forms), the modules may be provided separately to be assembled on the user side, or the smart camera may be provided with the illumination module and the lens module incorporated in the sensor body. In the case of the latter form, there is no need to adjust the optical conditions on the user side, so it has the advantage that the image sensor can be introduced more easily.

APPENDIX (1) An image sensor (1) comprising a body module (10), and a lens module (20) and an imaging module (30) installed in the body module (10), wherein
the body module (10) comprises:
an acquisition part (15) acquiring imaging element specification information indicating a size of an imaging element in the imaging module (30) from the installed imaging module (30) and acquiring optical system specification information indicating a specification of an optical system in the lens module (20) from the installed lens module (20);
a correction part (11), to which shading correction information is settable, performing shading correction on image data outputted by the imaging module (30) according to the set shading correction information; and
a generation and setting part (14) generating shading correction information corresponding to a combination of the imaging module (30) and the lens module (20) based on the imaging element specification information and the optical system specification information acquired by the acquisition part (15), and setting the shading correction information to the correction part (11).

(2) An image sensor (1) comprising a body module (10), and a lens module (20) and an imaging module (30) installed in the body module (10), wherein
the body module (10) comprises:
an acquisition part (15) acquiring format information indicating a format of the imaging module from the installed imaging module (30) and acquiring format information indicating a format of the lens module from the installed lens module (20);
a correction part (11), to which shading correction information is settable, performing shading correction on image data outputted by the imaging module (30) according to the set shading correction information; and
a generation and setting part (14) acquiring, from a predetermined device (40) that holds imaging element specification information indicating a size of an imaging element in each imaging module (30) in a form associated with format information of each imaging module (30) installable in the body module (10) and holds optical system specification information indicating a specification of an optical system in each lens module (20) in a form associated with format information of each lens module (20) installable in the body module (10), the imaging element specification information associated with the format information of the imaging module (30) and the optical system specification information associated with the format information of the lens module (20) acquired by the acquisition part (15), generating shading correction information corresponding to a combination of the imaging module (30) and the lens module (20) based on the acquired information, and setting the shading correction information to the correction part (11).

(3) An image sensor (1) comprising a body module (10), and a lens module (20) and an imaging module (30) installed in the body module (10), wherein
the imaging module (30) comprises:
an imaging element (31); and
a correction part (33), to which shading correction information is settable, performing shading correction on image data outputted by the imaging element (31) according to the set shading correction information, and
the body module (10) comprises:
an acquisition part (15) acquiring imaging element specification information indicating a size of the imaging element in the imaging module (30) from the installed imaging module (30) and acquiring optical system specification information indicating a specification of an optical system in the lens module (20) from the installed lens module (20); and
a generation and setting part (14) generating shading correction information corresponding to a combination of the imaging module (30) and the lens module (20) based on the imaging element specification information and the optical system specification information acquired by the acquisition part (15), and setting the shading correction information to the correction part (33) of the imaging module (30).

What is claimed is:
1. An image sensor comprising a body module, and a lens module and an imaging module installed in the body module, wherein
the body module comprises:
an acquisition circuit acquiring imaging element specification information indicating a size of an imaging element in the imaging module and acquiring optical system specification information indicating a specification of an optical system in the lens module, wherein the imaging module is exchangeable, and the imaging element specification information varies according to a specification of the imaging module;

a correction circuit, to which shading correction information is settable, performing shading correction on image data outputted by the imaging module according to the set shading correction information; and a generation and setting circuit generating shading correction information corresponding to a combination of the imaging module and the lens module based on the imaging element specification information and the optical system specification information acquired by the acquisition circuit, and setting the shading correction information to the correction circuit, wherein the imaging element specification information comprises incident angle characteristic information representing an incident angle characteristic of the imaging element and a pixel size and a number of pixels of the imaging element, the optical system specification information comprises an exit pupil diameter and an exit pupil position with respect to the optical system, and the generation and setting circuit of the body module generates the shading correction information in consideration of an incident angle range of light to each of a plurality of pixels of the imaging element based on the imaging element specification information and the optical system specification information acquired by the acquisition circuit, the shading correction information comprises an X direction correction information and a Y direction correction information, the correction circuit comprises an X direction correction table for setting the X direction correction information and a Y direction correction table for setting the Y direction correction information, the X direction correction information is set by multiplying the X direction correction table with a luminance value of pixels in an X coordinate, the Y direction correction information is set by multiplying the Y direction correction table with a luminance value of pixels in a Y coordinate, the X direction correction table and the Y direction correction table have a plurality of values, in which, a value among the plurality of values increases when an incident angle of light increases.

2. The image sensor according to claim 1, wherein the optical system specification information further comprises a peripheral light amount ratio information representing a peripheral light amount ratio of the optical system, and the generation and setting circuit of the body module generates the shading correction information in consideration of the incident angle range of light to each of a plurality of pixels of the imaging element and the peripheral light amount ratio of the optical system based on the imaging element specification information and the optical system specification information acquired by the acquisition circuit.

3. The image sensor according to claim 1, wherein the body module further comprises a setting adjustment circuit adjusting a setting of zoom or aperture of a second type lens module when the lens module is the second type lens module with adjustable zoom or aperture, and the generation and setting circuit of the body module generates the shading correction information in consideration of a zoom setting value or an aperture setting value of the second type lens module when the second type lens module is installed in the body module.

4. An image sensor comprising a body module, and a lens module and an imaging module installed in the body module, wherein the body module comprises:

an acquisition circuit acquiring a first format information indicating a format of the imaging module and acquiring a second format information indicating a format of the lens module, wherein the imaging module is exchangeable, and the first and second format information vary according to a specification of the imaging module;

a correction circuit, to which shading correction information is settable performing shading correction on image data outputted by the imaging module according to the set shading correction information; and a generation and setting circuit acquiring, from a predetermined device that holds imaging element specification information indicating a size of an imaging element in the imaging module in a form associate with the first format information of the imaging module installable in the body module and holds optical system specification information indicating a specification of an optical system in the lens module in a form associated with the second format information of the lens module installable in the body module, the imaging element specification information associated with the first format information of the imaging module and the optical system specification information associated with the second format information of the lens module acquired by the acquisition circuit, generating shading correction information corresponding to a combination of the imaging module and the lens module based on the acquired first and second format information, and setting the shading correction information to the correction circuit, wherein the imaging element specification information comprises incident angle characteristic information representing an incident angle characteristic of the imaging element and a pixel size and a number of pixels of the imaging element, the optical system specification information comprises an exit pupil diameter and an exit pupil position with respect to the optical system, and the generation and setting circuit of the body module generates the shading correction information in consideration of an incident angle range of light to each of a plurality of pixels of the imaging element based on the imaging element specification information and the optical system specification information acquired by the acquisition circuit, the shading correction information comprises an X direction correction information and a Y direction correction information, the correction circuit comprises an X direction correction table for setting the X direction correction information and a Y direction correction table for setting the Y direction correction information, the X direction correction information is set by multiplying the X direction correction table with a luminance value of pixels in an X coordinate, the Y direction correction information is set by multiplying the Y direction correction table with a luminance value of pixels in a Y coordinate, the X direction correction table and the Y direction correction table have a plurality of values, in which, a value among the plurality of values increases when an incident angle of light increases.

5. The image sensor according to claim 4, wherein the predetermined device is a storage device provided in the body module.

6. The image sensor according to claim 4, wherein the predetermined device is a device outside the body module.

7. An image sensor comprising a body module, and a lens module and an imaging module installed in the body module, wherein the imaging module comprises:
an imaging element; and
a correction circuit, to which shading correction information is settable,
performing shading correction on image data outputted by the imaging element according to the set shading correction information, and the body module comprises:
an acquisition circuit acquiring imaging element specification information indicating a size of the imaging element in the imaging module and acquiring optical system specification information indicating a specification of an optical system in the lens module, the imaging module is exchangeable, and the imaging element specification information varies according to a specification of the imaging module; and
a generation and setting circuit generating shading correction information corresponding to a combination of the imaging module and the lens module based on the imaging element specification information and the optical system specification information acquired by the acquisition circuit, and setting the shading correction information to the correction circuit of the imaging module, wherein the imaging element specification information comprises incident angle characteristic information representing an incident angle characteristic of the imaging element and a pixel size and a number of pixels of the imaging element, the optical system specification information comprises an exit pupil diameter and an exit pupil position with respect to the optical system, and the generation and setting circuit of the body module generates the shading correction information in consideration of an incident angle range of light to each of a plurality of pixels of the imaging element based on the imaging element specification information and the optical system specification information acquired by the acquisition circuit, the shading correction information comprises an X direction correction information and a Y direction correction information, the correction circuit comprises an X direction correction table for setting the X direction correction information and a Y direction correction table for setting the Y direction correction information, the X direction correction information is set by multiplying the X direction correction table with a luminance value of pixels in an X coordinate, the Y direction correction information is set by multiplying the Y direction correction table with a luminance value of pixels in a Y coordinate, the X direction correction table and the Y direction correction table have a plurality of values, in which, a value among the plurality of values increases when an incident angle of light increases.

* * * * *